March 24, 1964

D. HEBDEN 3,126,258

LIQUID-LIQUID CONTACTING APPARATUS

Filed Sept. 22, 1959

INVENTOR
DONALD HEBDEN

BY: *Lawson and Taylor*

ATTORNEYS

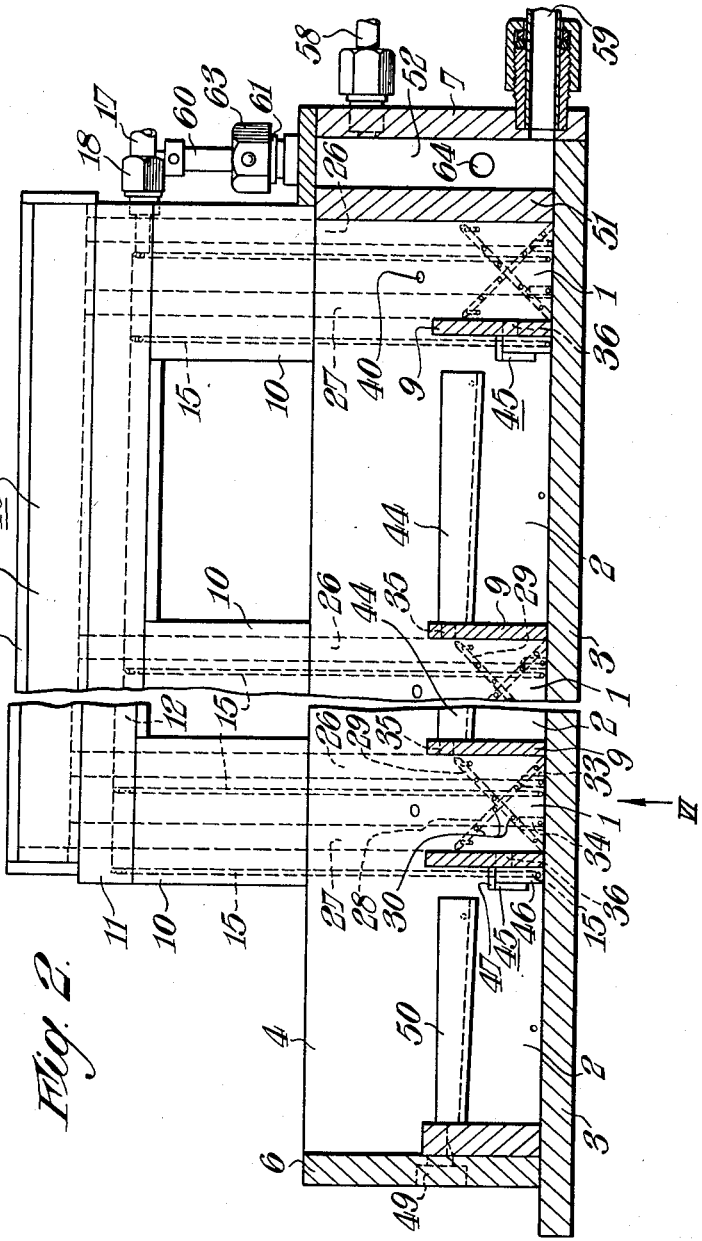

March 24, 1964  D. HEBDEN  3,126,258
LIQUID-LIQUID CONTACTING APPARATUS
Filed Sept. 22, 1959  7 Sheets-Sheet 3

INVENTOR
DONALD HEBDEN
BY
ATTORNEY

March 24, 1964   D. HEBDEN   3,126,258
LIQUID-LIQUID CONTACTING APPARATUS
Filed Sept. 22, 1959   7 Sheets-Sheet 4
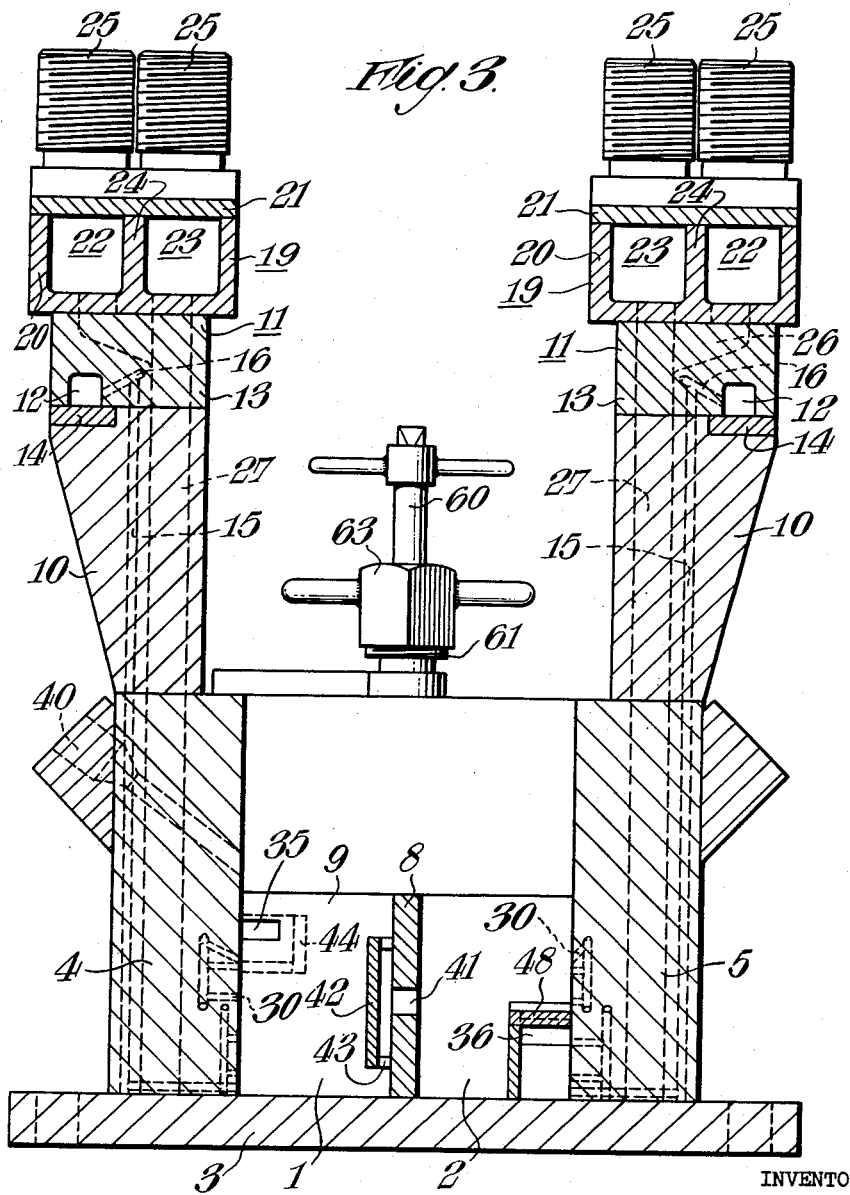
INVENTOR
DONALD HEBDEN
BY: *Lawson and Taylor*
ATTORNEYS

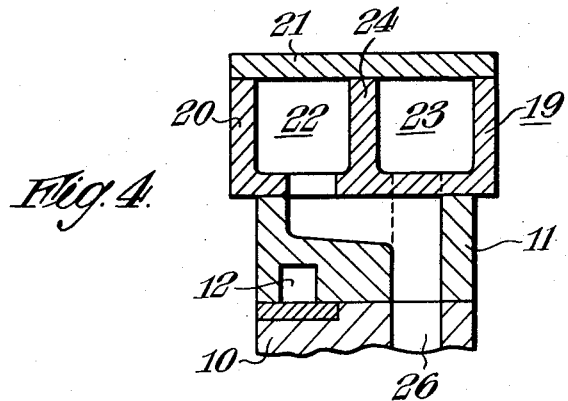
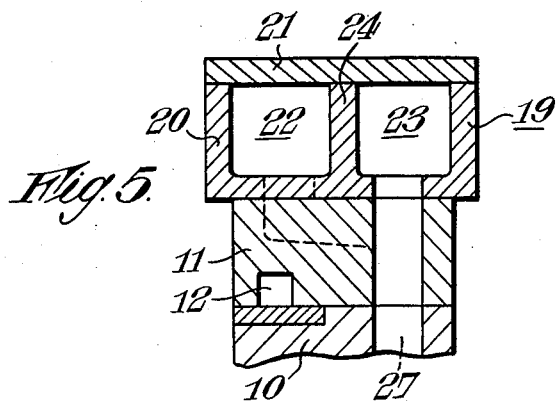
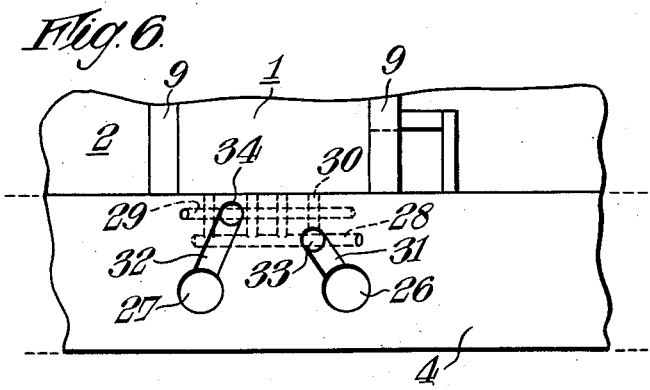

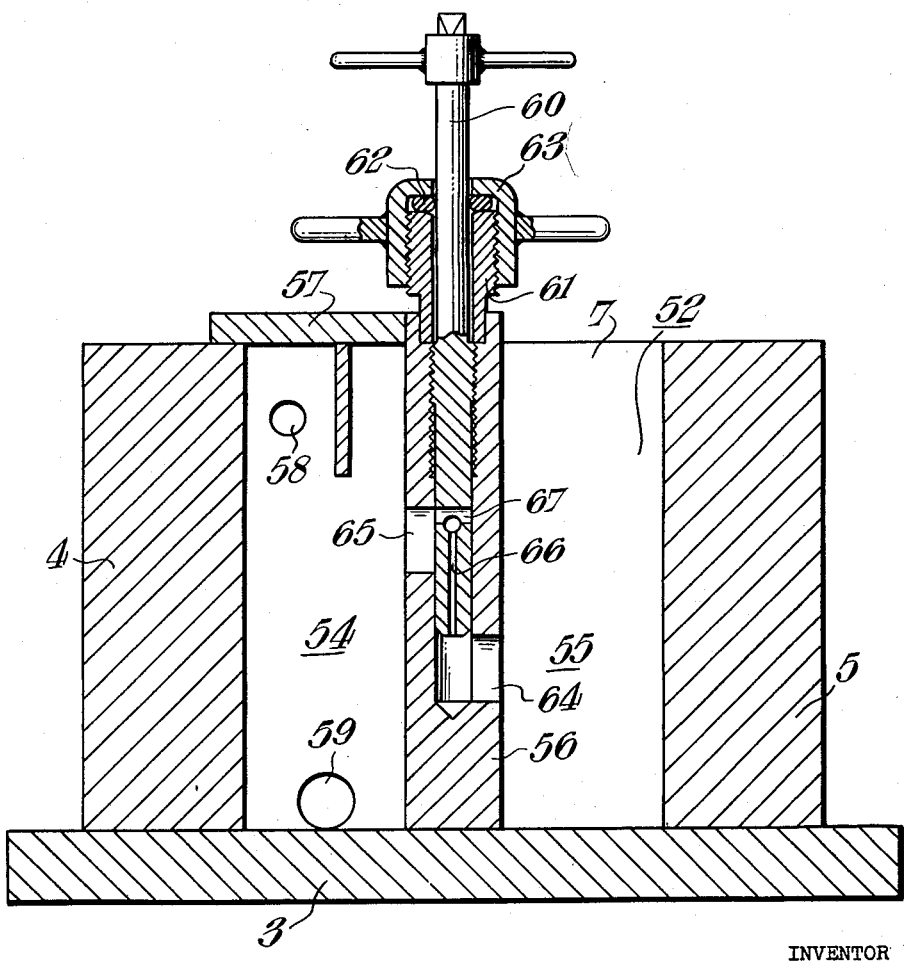

March 24, 1964 D. HEBDEN 3,126,258
LIQUID-LIQUID CONTACTING APPARATUS
Filed Sept. 22, 1959 7 Sheets-Sheet 7

INVENTOR
DONALD HEBDEN
BY: Lawson and Taylor
ATTORNEYS

United States Patent Office 3,126,258
Patented Mar. 24, 1964

3,126,258
LIQUID-LIQUID CONTACTING APPARATUS
Donald Hebden, Thurso, Caithness, Scotland, assignor to United Kingdom Atomic Energy Authority, London, England
Filed Sept. 22, 1959, Ser. No. 841,520
Claims priority, application Great Britain Sept. 25, 1958
2 Claims. (Cl. 23—270.5)

This invention relates to liquid-liquid contacting apparatus of the kind known as "mixer-settlers."

The invention is directed to the same general purpose as the apparatus set forth in U.S. application Serial No. 707,994.

The object of the invention is to provide mixer-settler apparatus wherein there is provided, in association with the mixer compartments of the apparatus, means for effectively mixing liquid phases without employing moving mechanical parts in contact with the liquids.

Mixer-settler apparatus according to the present invention has fluid flow ducts for withdrawing and returning liquid from and to each mixer compartment and is characterised in that said ducts are each connected at a number of levels to their respective mixer compartments.

In one form of the invention said ducts are in the form of passageways in the walls of the apparatus, each passageway being connected with its respective mixer compartment by a number of jet orifices at differing levels.

One embodiment of the invention will now be described by way of example with reference to the accompanying drawings in which:

FIG. 2 is a sectional elevation along the line II—II in FIG. 1.

FIG. 3 is a sectional elevation along the line III—III in FIG. 1.

FIG. 4 is a detail in section along the line IV—IV in FIG. 1.

FIG. 5 is a detail in section along the line V—V in FIG. 1.

FIG. 6 is a detail in section in the direction of the arrow VI in FIG. 2.

FIG. 7 is a sectional elevation along the line VII—VII in FIG. 1.

Figure 1:
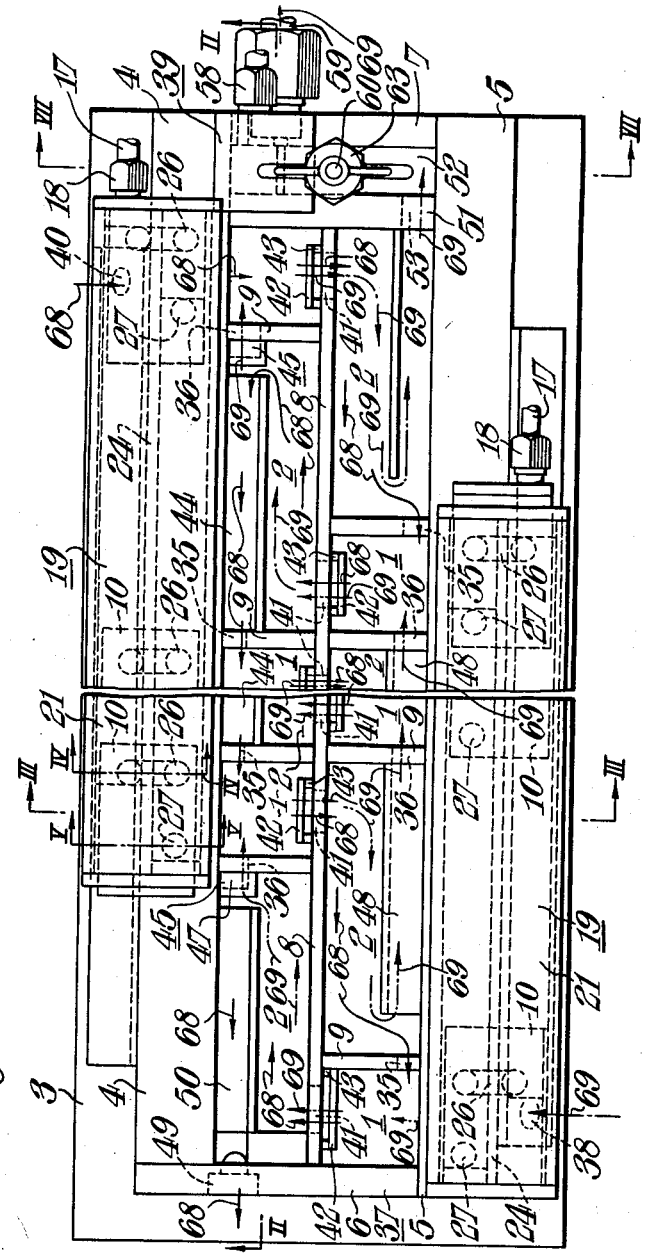
FIG. 1 is a plan view of a mixer settler apparatus embodying features in accordance with the invention.

In FIGS. 1, 2 and 3 there is shown a mixer-settler comprising a staggered arrangement of mixer compartments 1 and settler compartments 2. The mixer-settler is in the form of a rectangular box having a base plate 3, side walls 4 and 5 and end walls 6 and 7. The box is subdivided into the compartments 1 and 2 by a longitudinal centre partition 8 and transverse partitions 9, there being an equal number of mixer and settler compartments 1 and 2 (typically twenty of each). Vertical pillars 10 are mounted on the side walls 4 and 5 at intervals corresponding to the location of the mixer compartments 1. Two members 11 each having an internal channel 12 are supported by the pillars 10. The members 11 comprise strips 13 and 14 which run the length of the box between the end mixer compartments 1 on either side of the partition 8, the strips 13 being longitudinally grooved to form the channels 12. Drainage channels 15 for the compartments 1 and 2 connect with the channels 12 through the side walls 4 and 5 and the pillars 10. The drainage channels 15 are of a non-return nature in that they include sections 16 of reverse angle connecting with the channels 12. A pipe 17 is provided in connection with each of the channels 12 through a union coupling 18.

Twin manifolds 19 which are mounted on the members 11 comprise channelled members 20 enclosed by cover plates 21. Each manifold 19 is divided into two sections 22 and 23 by a longitudinal centre partition 24. Union bushes 25 fitted to the cover plates 21 provide for coupling of individual pipes with the separate sections 22 and 23 of the manifolds 19.

A series of vertical passageways 26 and 27 passing through the side walls 4 and 5 and the pillars 10 connect with the manifolds 19. As shown in FIG. 4 the passageways 26 connect with the sections 22 of the manifolds 19 while as shown in FIG. 5 the passageways 27 connect with the sections 23 of the manifolds 19. One of the passageways 26 and one of the passageways 27 is associated with each of the mixer compartments 1. Considering, for example, the mixer compartment 1 (which is shown in FIG. 2 on the left of the break in the section of this figure and which is also shown in FIG. 6), adjacent to this mixer compartment 1 and in the wall 4 there are the two associated passageways 26 and 27 and also two non-intersecting narrow bore passageways 28 and 29 drilled at 45° to the base plate 3 and at right angles to each other. Jet orifices 30 of 0.062" diameter at several levels in the mixer compartment 1 connect with the passageways 28 and 29. As shown in FIG. 6 the passageways 26 and 27 extend to the base of the wall and are respectively connected by channels 31 and 32 with blind holes 33 and 34 which respectively connect with the passageways 28 and 29.

Figure 2A:
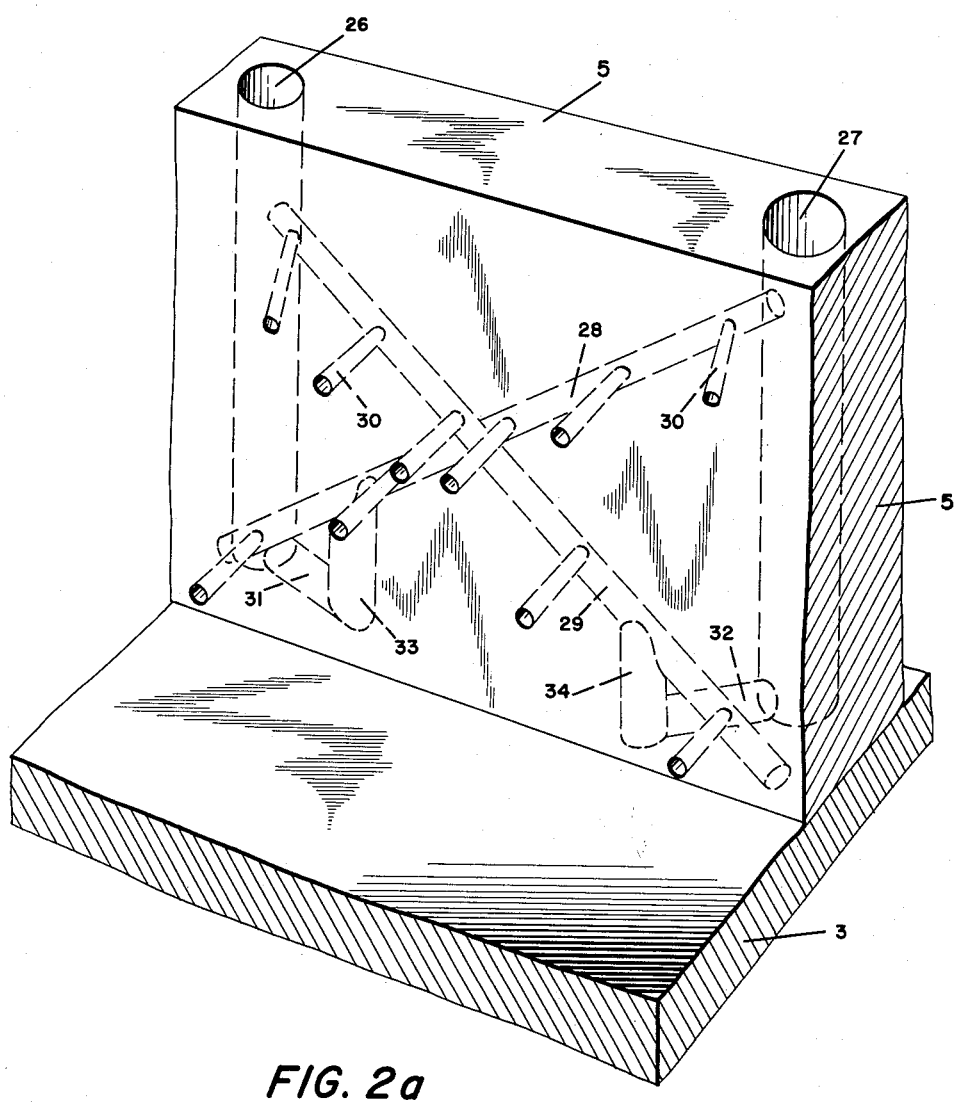
FIG. 2a is a partial perspective view showing the mixer compartment side wall.

FIG. 2a shows the corresponding side wall 5 and the associated passage ducts 26—31—33 and 27—32—34 for each mixer compartment, their respective narrow bore passageways 28, 29, and the jet orifices connecting the pasageways 28, 29 to the mixer compartment 1 at various levels thereof.

Referring again to FIGS. 1, 2 and 3 the mixer compartments 1 are connected with adjacent settler compartments 2 on either side by light and heavy phase inlet ports 35 and 36 excepting the last mixer compartment 1 at the end 37 of the mixer-settler which is provided with a heavy phase inlet 38 passing through the side wall 4. The last mixer compartment 1 at the end 39 of the mixer-settler is provided with a light phase inlet 40 passing through the side wall 5. All the mixer compartments 1 have mixed phase outlet ports 41 passing through the centre partition 8 and the ports 41 are shielded by baffle plates 42 supported by side members 43. The settler compartments 2 on one side of the mixer settler (that side above the partition 8 in FIG. 1) have light phase guide channels 44 associated with the light phase inlet ports 35 to the mixer compartments 1. On this side the settler compartments 2 also have heavy phase underflow weirs 45 associated with the heavy phase inlet ports 36 to the mixer compartments 1. The weirs 45 comprise side plates 46 and a top plate 47. On the other side of the mixer-settler (below the partition 8 in FIG. 1) the settler compartments 2 have heavy phase underflow channels 48 associated with the heavy phase inlet ports 36 to the mixer compartments 1. The last settler compartment 2 at the end 37 of the mixer settler is provided with a light phase outlet 49 and an associated guide channel 50. At the end 39 the mixer-settler is divided by a transverse partition 51 to form a heavy phase outlet sump 52. The last settler compartment 2 at the end 39 connects with the sump 52 through a port 53 in the partition 51. As shown in FIG. 7 the sump 52 is divided into two compartments 54 and 55 by a centre member 56. The compartment 54 is closed by a cover plate 57 and has connections through the end wall 7 with a vacuum line 58 and a heavy phase outlet pipe 59. The member 56 is bored and tapped to fit a threaded plunger 60 and is counterbored at its upper end to hold a threaded bush 61. The plunger 60 is sealed in passage through the bush 61 by a rubber O ring 62 which is compressed by an internally flanged nut 63 screwed on the bush 61. The member 56 has ports 64 and 65 respectively connecting with the compartments 55 and 54 of the sump 52. The plunger 60 has an axial passageway 66 open at one end to the port 64 and connecting at the other end with the port 65 through four radially disposed leads 67.

The mixer-settler is used, for example, for contacting of a heavy aqueous phase with a light solvent phase in order to effect mass transfer of solute between the phases.

The solvent phase is admitted into the mixer-settler through the light phase inlet 40 which connects with the first mixer compartment 1 at the end 39 of the mixer-settler. In this mixer compartment 1 the solvent phase is mixed with aqueous phase entering from the adjacent settler compartment 2 through the corresponding heavy phase inlet port 36. The overall movement of the solvent phase through the mixer settler is from right to left in FIG. 1 as shown by the solid arrows 68. Solvent phase mixed with aqueous phase in each of the mixer compartments 1 passes through the mixed phase ports 41 into the related settler compartments 2 where separation of the phases by settling occurs. The settled solvent phase in each settler compartment 2 then passes into the next mixer compartment in line through the corresponding light phase inlet port 35. Finally the solvent phase is removed from the mixer settler at the end 37 through the light phase outlet 49.

Flow of aqueous phase through the mixer-settler is generally from left to right in FIG. 1 as is shown by the chain dotted arrows 69. The aqueous phase is admitted through the heavy phase inlet 38 into the first mixer compartment 1 at the end 37 of the mixer settler. In this compartment 1 the aqueous phase is mixed with solvent phase entering from the adjacent settler compartment 2 through the corresponding light phase inlet port 35. The mixed phases pass through the mixed phase port 41 into the settler compartment 2 located opposite where phase segregation occurs and the separated aqueous phase is passed into the next mixer compartment 1 in line and thence after mixing with solvent phase to the related settler compartment 2, and so on. The aqueous phase is finally passed into the compartment 55 of the sump 52 through the port 53 in the partition 51. The aqueous phase passes from the compartment 55 into the compartment 54 via the ports 64 and 65 in the member 55 and the intermediate passageway 66 in the plunger 60. The aqueous phase finally leaves the mixer settler through the heavy phase outlet pipe 59. Rotation of the plunger 60 adjusts its position to control the level of aqueous phase in the compartment 55 of the sump 52, thus controlling the level of the interfaces between the aqueous and solvent phases in the settler compartments 2 and also the overall level of liquid in the mixer-settler.

Mixing of the phases in the mixer compartments 1 is as follows. Pressure in the manifolds 19 is repetitively varied in an oscillatory fashion so that liquid contained within the mixer compartments 1 is alternately drawn into and expelled from the passageways 26 and 27 via the jet orifices 30 and the passageways 28 and 29 to produce mixing of the two phases. It is arranged that the variation of pressure in the sections 22 of the manifolds 19 is 180° out of phase with the variation of pressure in the sections 23 in order to prevent oscillation of the level of liquid in the mixer compartments 1. In order to obtain initial mixing of the phases some of the jet orifices 30 are angled downwards (see FIG. 3) and mixing is initiated when light solvent phase forming an upper layer in the mixer compartments 1 is expelled into a lower level of heavy aqueous phase through the angled jet orifices 30. Coarse droplets of light phase which are formed in the heavy phase rise and recoalesce with the bulk of the light phase entrapping, as they do so, small globules of the heavy phase. Repetition gives a fine dispersion of heavy phase in a light phase medium.

The mixer-settler can be rapidly drained of liquid by applying suction to the channels 12 through the pipes 17, thus withdrawing liquid from the mixer settler through the passageways 15, the channels 12 and the pipes 17. Alternatively the mixer-settler can be partly drained by reducing pressure in the compartment 54 of the sump 52 by means of the vacuum line 58 when the drainage of aqueous phase through the outlet 59 is accelerated.

Figure 8:
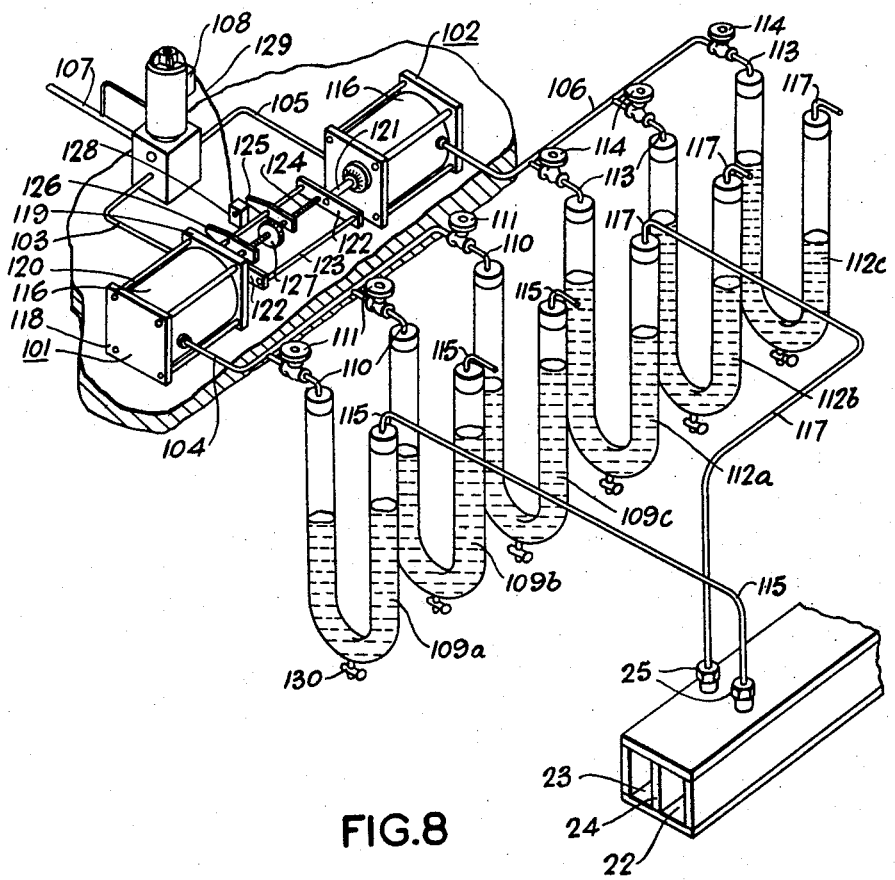
FIG. 8 is a perspective view of apparatus for energising the mixing operation of the mixer-settler apparatus.

FIG. 8 shows apparatus suitable for producing pressure variations in the sections 22, 23 of the manifolds 19.

In FIG. 8 there is illustrated an associated pair of double-acting cylinders 101 and 102. The cylinder 101 has an inlet pipe 103 and an outlet pipe 104 functioning as a manifold and the cylinder 102 has an inlet pipe 105 and an outlet pipe 106 functioning as a manifold. The inlet pipes 103 and 105 connect with a compressed air supply pipe 107 through a solenoid actuated valve 108 which controls the supply of compressed air to the pipes 103 and 105. The outlet pipe 104 connects with a group of three U-tubes 109a, 109b, 109c through pipes 110 having adjustable air bleed valves 111, while the outlet pipe 106 connects with a further group of U-tubes 112a, 112b, 112c through pipes 113 having adjustable air bleed valves 114. Outlet pipes 115 from the U-tubes 109a, 109b, 109c connect with the manifold section 22 and outlet pipes 117 from the U-tubes 112a, 112b, 112c connect with the manifold section 23 (for clarity only that outlet pipe 115 associated with the U-tube 109a and that outlet pipe 117 associated with the U-tube 112a are shown connected to the manifold sections 22 and 23 respectively).

The cylinders 101 and 102 are of similar construction and comprise a body 116 held between square end covers 118 and 119 clamped by tie rods 120.

The cylinders 101, 102 have piston rods 121 carrying transverse members 122 connected by rods 123. A threaded rod 124 rotatably supported between the transverse members 122 carries twin switch operating arms 125 and 126, which are slidable on one rod 123 and are movable along the threaded rod 124 by rotation of the rod 124 through a hand wheel 127. One half of the rod 124 has a left hand thread while the other half has a right hand thread so that the switch operating arms 125 and 126 can either be moved away from or towards each other. A double acting press button switch 128 is mounted between the switch operating arms 125 and 126. The switch 128 is connected to the valve 108 by a lead 129 and controls the operation of the valve 108.

In use of the apparatus of FIG. 8 the solenoid actuated valve 108 is energised so that compressed air from the supply pipe 107 is admitted to the inlet pipe 105 of the cylinder 102 and the inlet pipe 103 of the cylinder 101 is connected to exhaust. The inlet of air into the cylinder 102 causes the piston in this cylinder to move forcing air into the outlet pipe 106. The piston of the cylinder 101 moves with the piston of the cylinder 102 by virtue of the linkage between the two pistons and air is forced to exhaust along the pipe 103 while air is also drawn out of the pipe 104. As the pistons in cylinders 101, 102 reach the end of this stroke the switch arm 126 operates the switch 128 to change the energisation of the valve 108 so that the inlet pipe 105 is now connected to exhaust and the inlet pipe 103 is connected to the compressed air supply pipe 107. Thus a return stroke is made by the pistons in the cylinders 101, 102 air being forced into the outlet pipe 104. Air is also forced to exhaust along the pipe 105 and air is drawn out from the pipe 106. When the end of the latter stroke is reached the switch arm 125 operates the switch 128 to change back the energisation of the solenoid actuated valve 108. Thus a continuous oscillation of the pistons in cylinders 101, 102 occurs.

The U-tubes 109a–c and 112a–c are partly filled with water which prevents escape of vapour from the mixer-settler and provides a medium for the transmission of the air pressure variations in the pipes 104 and 106. Contaminated water is drained from the U-tubes through taps 130 which also provide for admittance of clean water to the tubes. The variation of the air pressure in the pipes 104 and 106 causes oscillation of the water contained within the U-tubes, the oscillation of the water in the U-tubes 109a–c being 180° out of phase with that in the U-tubes 112a–c. The oscillation of the water in the U-tubes 109a and 112a causes oscillatory pressure variations in the manifold sections 23, 24 which causes mixing of the phases in the mixer compartments of the apparatus in a manner described above. The oscillation in the U-tubes 109b and 112b etc. can be used to feed other manifold sections.

I claim:

1. In a mixer-settler apparatus for mixing liquids of differing density and having means defining a series of interconnected and horizontally disposed mixer compartments and settler compartments, the said defining means including upright side walls for each mixer compartment and each settler compartment for holding the liquids, the improvement of mixing means comprising:

(a) duct means wherein an upright side wall for each mixer compartment internally defines a pair of elongate non-intersecting passageways at angles to each other, both of the passageways extending from an upper portion of the said upright sidewall to a lower portion of the said upright sidewall; and a plurality of separate jet orifices for each passageway disposed along the length of the respective passageway and connecting the respective passageway to the mixer compartment at various levels of the mixer compartment from the upper portion to the lower portion of the said upright sidewall;

(b) first means for alternately decreasing and increasing the fluid pressure in one of the passageways in the direction of the jet orifices and mixer compartment to cause liquid in the mixer compartment to be respectively drawn into and expelled from the one passageway via the jet orifices, and second means for correspondingly alternately increasing and decreasing the fluid pressure in the other of the passageways to cause the liquid to be respectively expelled from and drawn into the said other passageway, such that the liquid is drawn into the one passageway as it is expelled from the other passageway and is expelled from the one passageway as it is drawn into the other passageway; and (c) a pair of passage ducts, one of the passage ducts connecting the one of said passageway to the first means for alternately decreasing and increasing the fluid pressure, and the other of the passage ducts connecting the other of the passageways to the second means for alternately increasing and decreasing the fluid pressure.

2. In a mixer-settler apparatus according to claim 1, wherein the jet orifices at the upper portion are directed downwardly from the passageways to the mixer compartment.

References Cited in the file of this patent

UNITED STATES PATENTS

| | | |
|---|---|---|
| 430,242 | Way | June 17, 1890 |
| 1,716,294 | Bond | June 4, 1929 |
| 2,629,654 | Olney | Feb. 24, 1953 |
| 2,682,452 | Wainwright | June 29, 1954 |
| 2,767,068 | Maycock et al. | Oct. 16, 1956 |
| 2,845,936 | Boynton et al. | Aug. 5, 1958 |
| 2,879,144 | Thornton | Mar. 24, 1959 |